United States Patent [19]
Sandor

[11] 3,801,085
[45] Apr. 2, 1974

[54] GAS SPRING BOOSTER ARRANGEMENT
[75] Inventor: Bela Sandor, Detroit, Mich.
[73] Assignee: General Motors Corporation, Detriot, Mich.
[22] Filed: Aug. 24, 1972
[21] Appl. No.: 283,531

[52] U.S. Cl. ................................ 267/8 R, 267/34
[51] Int. Cl. ........................................... B60g 13/06
[58] Field of Search .......................... 267/34, 65, 8

[56] References Cited
UNITED STATES PATENTS

| | | | |
|---|---|---|---|
| 1,904,372 | 4/1933 | Kane | 267/34 |
| 2,476,228 | 7/1949 | Thornhill | 267/34 |
| 2,833,535 | 5/1958 | Blythe | 256/8 |
| 2,981,534 | 4/1965 | Peras | 267/8 |

*Primary Examiner*—James B. Marbert
*Attorney, Agent, or Firm*—Herbert Furman

[57] ABSTRACT

A gas spring includes an elongated cylinder defining an elongated cavity which receives a pressurized gas and a piston slidable between the opposite ends of the cavity to provide a pair of chambers whose volumes vary during this piston movement and whose states of pressure are equalized by gas flow through a restricted passage in the piston. One end of the cylinder includes an aperture in which an elongated connecting rod is sealingly slidable for movement between retracted and extended positions relative to the cylinder. The inner end of the connecting rod is attached to the piston to reduce the area of the piston facing the apertured end of the cylinder and thus provide a differential area between the opposite sides of the piston so that the pressurized gas normally urges the piston toward this end of the cylinder and biases the connecting rod toward the extended position. A booster includes a helical spring that has one of its ends seated against the apertured end of the cylinder and which extends outwardly from the cylinder encircling the outwardly extending portion of the connecting rod. The other end of the helical spring seats against an apertured plate which slidably receives the connecting rod. The outer end of the connecting rod engages the apertured plate during a limited range of movement of the connecting rod adjacent the retracted position. Retraction of the connecting rod within this range of movement compresses the helical spring to aid the gas in biasing the connecting rod toward the extended position. An elongated hollow cover encloses the helical spring with one end of the cover secured to the apertured plate and with the other end of the cover slidable along the cylinder and engageable with an annular flange of the cylinder to limit outward movement of the cover when the connecting rod is extended past the limited range of movement.

3 Claims, 2 Drawing Figures

PATENTED APR 2 1974　　　　　　　　　　　　　　　3,801,085

GAS SPRING BOOSTER ARRANGEMENT

BACKGROUND OF THE INVENTION

This invention relates generally to gas springs.

Gas springs conventionally include an elongated cylinder defining an elongated cavity which receives a pressurized gas and a piston slidable between the opposite ends of the cavity to provide a pair of chambers whose volumes vary during this piston movement. The piston defines a passage allowing pressure equalization of the gas between these chambers. One end of the cylinder defines an aperture in which an elongated connecting rod is sealingly slidable for axial movement relative to the cylinder between extended and retracted positions. The inner end of the connecting rod is attached to the piston to reduce the area of the piston facing the apertured end of the cylinder. This reduction in area provides a differential area between the opposite sides of the piston such that the pressurized gas normally biases the piston toward the apertured end of the cylinder to move the connecting rod to its extended position. It is also known to provide a secondary passage through the piston having a check valve type arrangement that allows increased gas flow through the piston during retraction of the connecting rod such that viscous damping during this retracting mode of movement is less than the viscous damping during the extending mode of movement.

In certain applications, a gas spring may require a greater force biasing the connecting rod toward extended position from retracted position than is provided by the pressurized gas acting on the differential area of the piston. For instance, a gas spring may be utilized as a counterbalance for a vehicle body compartment panel such as a trunk panel or an engine hood panel. The gas spring may operate on a relatively short lever arm when the panel is in closed position and, as such, may not provide a sufficient biasing force for moving the panel toward open position without an initial manual assist.

SUMMARY OF THE INVENTION

One feature of this invention is that it provides a gas spring whose elongated cylinder supports a resilient booster which is engaged by the outer end of the connecting rod of the gas spring and is elastically deformed thereby during a limited range of movement of the connecting rod adjacent its retracted position such that the booster aids the normal bias of the gas spring during this range of movement in urging the connecting rod toward its extended position. Another feature of the invention is that the booster includes a helical spring, with one end of the helical spring mounted on the cylinder, and with the other end of the helical spring engaged by the connecting rod to provide the resilient bias urging the connecting rod toward its extended position. Another feature of the invention is that the helical spring extends outwardly from the end of the cylinder through which the connecting rod extends and the helical spring encircles the connecting rod such that the booster bias results from compression of the helical spring by engagement of the outer end of the connecting rod with the outer end of the helical spring. Another feature of the invention is that an elongated hollow cover encloses the helical spring and has one of its ends secured to the outer end of this spring and its other end slidable along the cylinder to thus allow movement of the cover during deformation of the helical spring. Another feature of the invention is that the outer end of the spring is fixed relative to the adjacent end of the cover by an apertured plate which slidably receives the connecting rod and the other end of the cover engages an annular flange of the cylinder to limit sliding outward movement of the cover.

BRIEF DESCRIPTION OF THE DRAWINGS

The above specified features and other features of this invention are readily apparent from the following description of the preferred embodiment and the drawings in which.

DESCRIPTION OF THE PREFERRED EMBODIMENT

Figures 1, 2:
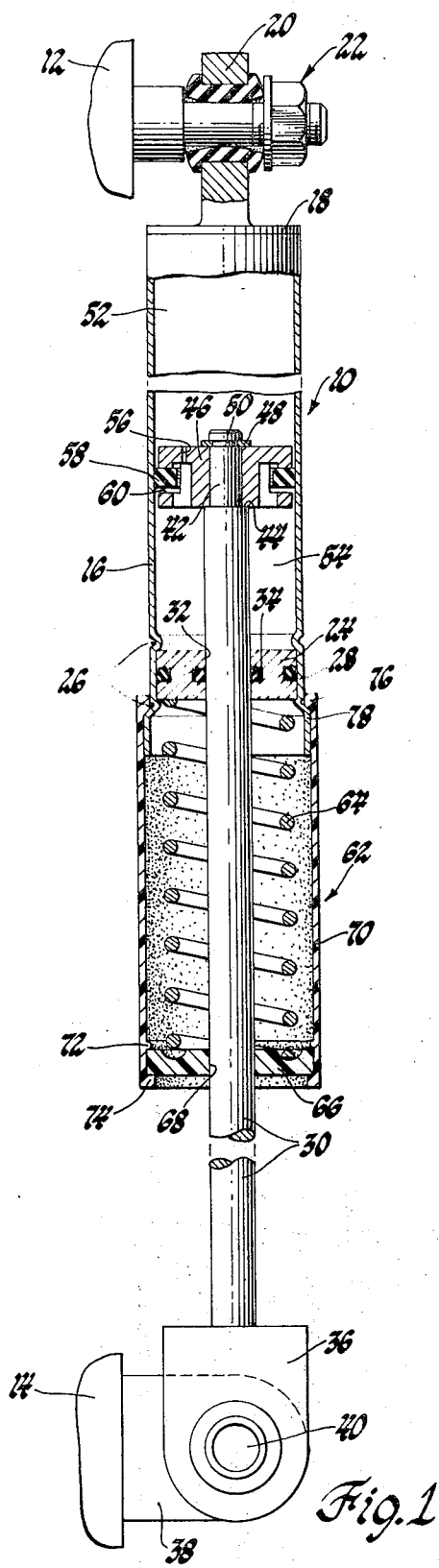
FIG. 1 is a longitudinal sectional view taken through a gas spring whose connecting rod is shown in an extended position and which includes a booster arrangement according to this invention.
FIG. 2 is a sectional view similar to FIG. 1 but with the connecting rod moved to a retracted position where the booster arrangement aids the normal bias of the gas spring in urging the connecting rod toward extended position.

Referring to the drawings, a gas spring is generally indicated by 10 and is utilized to connect upper and lower members 12 and 14 and to provide a bias urging these members away from each other in a manner that will become apparent. The gas spring includes an elongated cylinder 16 which has an elongated annular configuration. The cylinder includes an end plate 18 which closes its upper end and is suitably secured in position such as by welding. A lug 20 extends upwardly from end plate 18 and is apertured to receive a bushed nut and bolt arrangement generally indicated by 22. The bolt of this arrangement is suitably secured to the upper member 12 such that the upper end of the gas spring is thus attached to this member. The cylinder 16 includes a generally annular plug 24 closing its lower end and axially spaced annular flange portions 26 which engage the opposite ends of plug 24 to secure it in position. A conventional annular seal 28 provides sealing at the outer circumference of the plug.

An elongated connecting rod 30 is slidably received within the central aperture 32 of plug 24 and a conventional annular seal 34 provides sealing at the sliding interface of these components of the gas spring. The lower end of connecting rod 30 is suitably attached to a bifurcated attachment 36 which receives an apertured lug 38 extending from the lower member 14. A pin 40 pivotally connects the bifurcated attachment 36 and the lug 38 to thus connect the lower end of gas spring 10 with the lower member 14. The upper end of connecting rod 30 has a reduced diameter portion 42 and an annular upwardly facing piston seat 44. A piston 46 includes a central aperture receiving the reduced diameter portion 42 of the connecting rod and the piston engages the piston seat 44. A split washer type fitting 48 is snapped into a groove 50 in the reduced diameter portion 42 and engages the piston to thus secure the piston and connecting rod to each other. The piston divides the elongaged cavity of cylinder 16 into an upper chamber 52 and a lower chamber 54 and defines a restricted passage 56 that allows pressure equalization between these chambers. The attachment of the connecting rod to the piston reduces the area of the piston 46 which faces the lower chamber 54 such that the area of the piston which faces the upper chamber 52 is greater and a differential area is provided between the opposite sides of the piston. A piston ring type valve element 58 slidably engages the wall of the elongated cavity defined by cylinder 16 and is received within an annular groove 60 in the piston for movement between the position of FIG. 1 engaging the upper edge of this groove and the position of FIG. 2 engaging the lower edge of the groove such that the valve element functions in a manner to be described.

The cylinder 16 is suitably charged with a pressurized gas which flows through passage 56 to equalize the pressure within the chambers 52 and 54. Due to the differential area on the opposite sides of the piston 46, the downward force of the gas acting on the upper side of the piston is greater than the upward force of the gas acting on the lower side of the piston. Consequently, the gas biases the piston and connecting rod downwardly to the extended position shown in FIG. 1. Friction between the valve element 58 and cylinder 16 causes the valve element to seat against the upper edge of the groove 60 in piston 46 during this extending mode of movement, such that the gas must flow through passage 56 to equalize the pressure in the chambers. An upward force applied to the connecting rod 30 when it is located in its FIG. 1 extended position works against the gas pressure acting on the differential area between the opposite sides of piston 46 and causes the piston and connecting rod arrangement to move upwardly toward the FIG. 2 retracted position. Friction acts on valve element 58 during this retracting mode of movement and seats the valve element against the lower edge of the groove 60 defined by the piston. Consequently, gas flows over the valve element 58 and between the piston 46 and cylinder 16, in addition to flowing through the passage 56, in order to equalize the pressure in chambers 52 and 54. This secondary passage for gas flow thus allows the retracting movement to proceed without significant viscous damping at a rate that would not be possible were the gas limited to flowing through passage 56.

It is thus apparent that the gas spring 10 provides a bias which tends to move the members 12 and 14 away from each other. This movement may occur by upper member 12 remaining stationary as member 14 moves, by member 14 remaining stationary as member 12 moves, or by each of these members moving to a certain degree. The gas spring will continue to function in the manner described for each of these types of movement.

The lower end of gas spring 10 includes a booster 62 that is constructed according to this invention. The booster includes a helical spring 64 which encircles the connecting rod 30 and has its upper end seated against the outer end of plug 24. The lower end of helical spring 64 seats against a generally annular plate 66 whose central aperture 68 slidably receives the connecting rod. A generally annular cover 70 has an elongated configuration with a pair of spaced annular flange portions 72 and 74 that engage the upper and lower sides of annular plate 66 to secure the cover relative to this plate. The upper end of the cover 70 includes an annular flange portion 76 which slidably engages the outer surface of the cylinder 16 and engages an outwardly extending annular flange 78 of the cylinder 16 when the booster is in its position shown in FIG 1. This engagement limits the downward movement of the cover 70 and maintains the cover in a position enclosing the helical spring 64.

During retracting movement of the piston and connecting rod arrangement relative to the cylinder 16, the upper surface of the bifurcated attachment 36 on the lower end of the connecting rod approaches the annular plate 66 as the connecting rod slides through the central aperture 68 in this plate. The bifurcated attachment 36 engages annular plate 66 upon a predetermined degree of this retracting movement and further retraction causes the annular plate to compress helical spring 64 in the manner shown by FIG. 2. The cover 70 moves upward relative to cylinder 16 during the compression of the helical spring and flange portion 76 slides upwardly along the outer surface of the cylinder 16. This spring compression provides a resilient bias which aids the gas acting on the differential area of piston 46 in providing a bias urging the cylinder 16 and the piston and connecting rod arrangement to move in an extending direction relative to each other. The flange portion 76 of the cover engages the annular flange 78 of the cylinder 16 and limits further downward movement of the cover 70 as the bifurcated attachment 36 disengages the annular plate 66 during the extending mode of movement. Thus, the booster 62 plays no part in the operation of the gas spring except when it is operating in the limited range of movement adjacent retracted position.

The increased extending bias provided to gas spring 10 by the booster 62 adjacent the limited portion of its movement in retracted position is useful when the gas spring is utilized for a counterbalance arrangement with a vehicle compartment panel such as a trunk panel or an engine compartment panel. The gas spring may act on a relatively short lever arm during the initial opening movement of the compartment panel and may not supply sufficient torque to counterbalance the panel or provide an initial pop-up movement of the panel without the increased bias supplied by the booster.

The invention thus provides a gas spring booster arrangement.

What is claimed is:

1. A gas spring comprising, an elongated cylinder defining an elongated cavity, a piston received within the cylinder and slidable between the opposite ends of the cavity to provide a pair of chambers whose volumes vary during this piston movement, the piston defining a restricted passage for communicating the chambers and allowing pressure equalization therebetween, sealing means defining an aperture at one end of the cylinder, an elongated connecting rod sealingly slidable within the aperture of the sealing means for movement between retracted and extended positions relative to the cylinder and having its inner end attached to the piston, the attachment between the connecting rod and the piston reducing the area of the piston facing the sealing means to provide a differential area between the opposite sides of the piston, a pressurized gas received within the cylinder and flowing through the passage in the piston to provide equal stages of pressure within the chambers, the gas normally urging the piston toward the sealing means as a result of the differential area between the opposite sides of the piston to normally bias the connecting rod toward the extended position, a booster including a helical spring encircling the connecting rod and mounted on the cylinder extending outwardly from the end thereof including the sealing means, the helical spring being engaged by the outer end of the connecting rod during a limited range of movement thereof adjacent the retracted position and being compressed during retraction of the connecting rod during this limited range of movement to provide a bias aiding the gas in urging the connecting rod toward extended position, and an elongated hollow cover for the helical spring, the cover being composed of a rigid material and having one end thereof seating the outer end of the helical spring and the other end thereof slidable on the outer side of the cylinder to thus enclose the helical spring while allowing sliding movement of the cover along the cylinder axially of the longitudinal axis thereof during compression and extension of the helical spring under the impetus of the connecting rod moving within the limited range of movement adjacent its retracted position.

2. A gas spring according to claim 1 wherein the outer end of the cover includes an apertured plate seating the helical spring and slidably receiving the connecting rod.

3. A gas spring according to claim 1 wherein the inner end of the cover engages a flange on the cylinder to limit sliding movement of the cover in the direction of extending movement of the connecting rod.

* * * * *

PO-1050
(5/69)

UNITED STATES PATENT OFFICE
CERTIFICATE OF CORRECTION

Patent No. 3,801,085  Dated April 2, 1974

Inventor(s) Bela Sandor

It is certified that error appears in the above-identified patent and that said Letters Patent are hereby corrected as shown below:

Claim 1, column 4, line 64, the word "stages" should read -- states --.

Signed and sealed this, 22nd day of October 1974.

(SEAL)
Attest:

McCOY M. GIBSON JR.
Attesting Officer

C. MARSHALL DANN
Commissioner of Patents